United States Patent [19]

Larsen

[11] 4,116,417
[45] Sep. 26, 1978

[54] NEEDLE VALVE TYPE PUMP INJECTOR

[76] Inventor: Ward Orin Larsen, Rt. 1 Box 27, Glenwood, Wash. 98619

[21] Appl. No.: 611,338

[22] Filed: Sep. 8, 1975

[51] Int. Cl.² ............................................. F16K 1/04
[52] U.S. Cl. ............................ 251/122; 251/DIG. 4; 251/205; 137/604
[58] Field of Search ................ 285/332; 251/DIG. 4, 251/205, 122; 137/604

[56] References Cited

U.S. PATENT DOCUMENTS

| 715,658 | 12/1902 | Hampson et al. | 251/122 X |
| 938,601 | 11/1909 | Haas | 251/122 X |
| 1,746,055 | 2/1930 | Roberts et al. | 251/DIG. 4 |
| 2,100,407 | 11/1937 | Peo et al. | 251/122 X |
| 2,454,557 | 11/1948 | Jacobson | 285/332 X |
| 2,761,704 | 9/1956 | Crawford | 285/332 X |
| 2,774,352 | 12/1956 | Emerson | 137/604 X |
| 2,832,641 | 4/1958 | Korda | 251/122 X |
| 2,874,719 | 2/1959 | Van Tuyl | 137/604 |
| 3,240,230 | 3/1966 | Callahan et al. | 251/205 X |

Primary Examiner—Arnold Rosenthal
Attorney, Agent, or Firm—Klarquist, Sparkman, Campbell, Leigh, Hall & Whinston

[57] ABSTRACT

The pump Injector is a brass valve with a needle type regulator that is adapted onto the intake side of a pump. This injector enables a person to regulate the flow of a liquid composition into the main flow of water or other liquid that is being pumped by adjustment of the needle valve. Specifically, the liquid that is to be used is in a container. A clear plastic hose runs from the container and connects to the pump injector. The vacuum from the pump sucks the liquid from the container up through the plastic hose through the hose connection sleeve and down past the needle valve head and along the flattened side of the brass valve. It is then sucked through the 1/16 inch side port hole and is regulated by the needle valve. The regulated flow passes on down into the liquid being pumped.

5 Claims, 10 Drawing Figures

U.S. Patent  Sept. 26, 1978  4,116,417
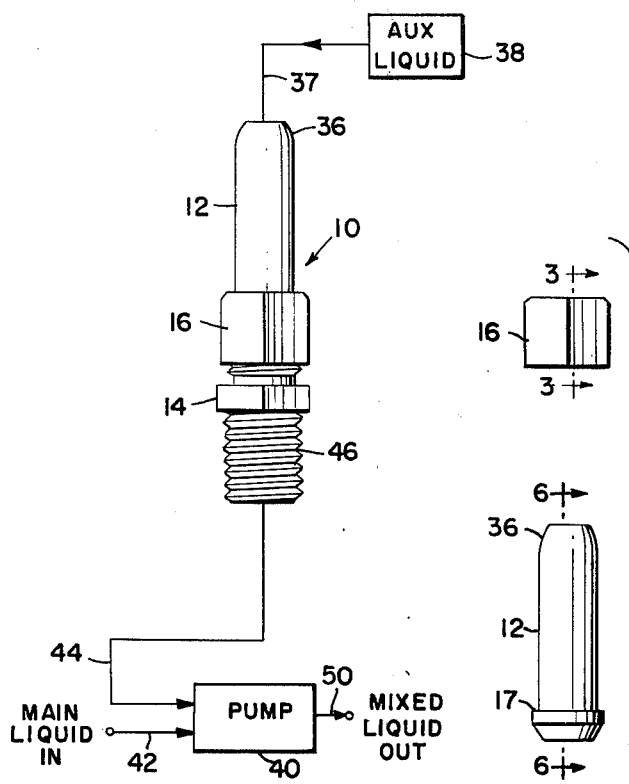
FIG. 1
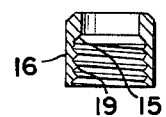
FIG. 3
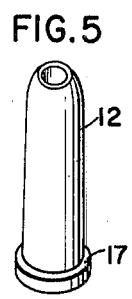
FIG. 4
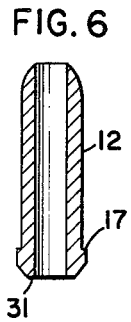
FIG. 5 FIG. 6
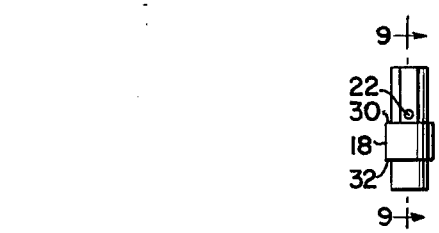
FIG. 2
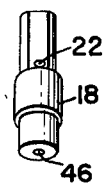
FIG. 7
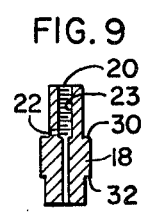
FIG. 8 FIG. 9
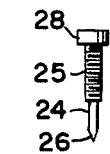
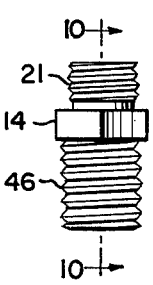
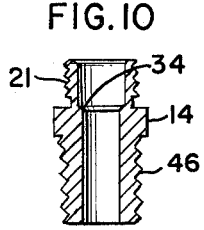
FIG. 10

NEEDLE VALVE TYPE PUMP INJECTOR

BACKGROUND OF INVENTION

The subject matter of the present invention relates generally to needle valves, and in particular to an adjustable needle valve in a pump injector apparatus. The adjustable needle valve member is positioned inside a sleeve and provided with a set screw type head for adjustment by a tool inserted into such sleeve to prevent tempering.

This injector could be adapted onto a fire fighting pump enabling a regulated flow of wet water to be injected which would make the water 8 times more effective.

This injector could also be adapted onto a farmers sprinkling system enabling him to apply a liquid composition to treat his land.

SUMMARY OF INVENTION

The main object of the present invention is to provide an improved pump injector for attachment to a liquid pump to inject an auxiliary liquid into the main pumped liquid.

Another object of the invention is to provide such a pump injector of a needle valve type with a simple, economical and trouble free construction.

A further object of the invention is to provide such a pump injector in which the needle valve is adjustable and has an adjustment head provided within a sleeve surrounding the valve to prevent tampering.

DRAWINGS

Other objects and advantages of the present invention will be apparent from the following description of a preferred embodiment thereof and from the attached drawings of which:

FIG. 1 is a side elevation view of a pump injector apparatus using the needle valve pump injector of the present invention;

FIG. 2 is an exploded view of the needle valve pump injector of FIG. 1;

FIG. 3 is a vertical section view of the compression nut taken along the line 3—3 of FIG. 2;

FIG. 4 is an oblique elevation view showing the butt end of the hose connection sleeve of FIG. 2;

FIG. 5 is an oblique elevation view showing the tapered tip end of the hose connection sleeve;

FIG. 6 is a vertical section view of the hose connection sleeve taken along the line 6—6 of FIG. 2;

FIG. 7 is an oblique elevation view showing the outlet end of the valve seat member of FIG. 2;

FIG. 8 is an oblique elevation view of the top end of the valve seat member of FIG. 2;

FIG. 9 is a vertical section view of the valve seat member taken along the line 9—9 of FIG. 2; and FIG. 10 is a vertical section view of the compression connector member taken along the line 10—10 of FIG. 2.

DESCRIPTION OF PREFERRED EMBODIMENT

The needle valve pump injector 10 of the present invention is shown in FIGS. 1 and 2 and includes a hose connection sleeve 12 and a tubular compression connector member 14 which are secured together by a compression nut 16. Thus, as shown in FIGS. 3, 6 and 10, the compression nut 16 has an internal shoulder 15 which engages a flange 17 on the butt end of sleeve 12 and has a larger diameter passage 19 which is threaded to engage the external threads 21 on the top of connector 14.

When the pump injector 10 is assembled the sleeve 12 contains a valve seat member 18 having a longitudinal passage 20 therethrough as shown in FIG. 9. An inlet port 22 extends through a flattened side of said valve seat member into an enlarged upper portion 23 of the passage 20. This upper portion 23 of the passage is threaded for the receipt of a needle valve member 24 having a threaded shank portion 25 as shown in FIG. 2. The needle valve member has a tapered shank portion 26 at one end whose longitudinal position in the passage 20 is adjusted to control the flow of liquid through port 22 and passage 20. The needle valve member includes an enlarged adjusting head 28 at its other end which has a slot or recess like that of a set screw for adjustment by a tool, such as a screwdriver or Allen wrench.

The valve seat member 18 is clamped in position between the sleeve 12 and connector 14 by the compression nut 16. In such clamped position the valve seat member has its upper flange shoulder 30 engaging the butt end 31 of the sleeve 12, and its lower flange shoulder 32 engaging an inner shoulder 34 within the compression connector 14, as shown in FIGS. 6, 9 and 10.

The hose connector sleeve 12 has a tapered top end 36 which is inserted into one end of a hose (not shown) and thereby is connected through a supply line 37 to a container 38 containing a supply of auxiliary liquid which is to be injected into a pump 40. The pump is connected at a main inlet 42 to a source of water or other liquid which is the main liquid being pumped and is connected at an auxiliary inlet 44 to the pump injector 10 of the present invention. Thus, the connector 14 has an externally threaded bottom end 46 which is screwed into a threaded opening in the pump forming inlet 44. The vacuum produced by the pump 40 at inlet 44 sucks the auxiliary liquid from container 38 into the sleeve 12, through the side port 22 into passage 20 of the valve seat member 18, out of an outlet opening 48 at the bottom of such passage and into the inlet 44 of the pump. This auxiliary liquid is mixed with the main liquid in the pump and the resulting mixed liquid is pumped out of a pump outlet 50. The flow of the auxiliary fluid is regulated by turning adjustment of the needle valve member 24.

The pump injector 10 is made in the following manner: Valve Seat - Refer to FIGS. 2, 7, 8 and 9

The valve seat 18 is made from a solid piece of brass rod 5/16 inch outer diameter and ⅞ of an inch long. Using a ¼ inch electric drill I inserted the 5/16 OD rod in the chuck with 20/64 inch of the rod sticking out. Then with drill running I draw filed the 20/64 inch area down to 13/64 OD. I then took a center punch and marked the center of the 13/64 OD end. Next I took a ¼ inch chuck electric drill with a 1/16 inch drill and drilled a hole through the center, end to end, the entire length (⅞ of an inch). I then drilled with a 7/64 inch drill 23/64 of an inch in on the 20/64 inch end, following the 1/16 inch hole. Then I took a tap 6NF40 and threaded the 7/64 hole for 20/64 of an inch. I then reversed the 5/16 OD rod and retightened it leaving 6/32 of an inch exposed of the 5/16 OD end. I then, with drill running, draw filed the 6/32 inch down to 15/64 OD. I again reversed ends in the chuck so the 20/64 inch of the 13/64 OD was sticking out. Then I filed a flat surface on one side the full 20/64 of an inch removing 1/32 of an inch. I then took a ¼ inch chuck electric drill, with a 1/16 inch drill, and drilled a hole in the center on the flat surface 16/64 of an inch from the end, through the wall into the 7/64 inch hole in the center.

Needle Valve - Refer to FIG. 2

The needle valve 24 is a stainless steel bolt 6NF40 × 1 inch long with a set screw head of 7/64 inch. I placed the threaded end of this bolt in the chuck of my ¼ inch electric drill leaving 40/64 inch of the threaded part exposed, plus the head which is 8/64 inch long. I measured in 29/64 from the bolt head. From there to 44/64 I draw filed, with drill running, the section, starting at 17/64 and going down to 5/64 OD. At 44/64 inch from the top of the head I started a taper to the cut off point at 48/64. Next I turned down the head of the bolt to 12/64 Od. This finishes the Needle Valve. I then took the Needle Valve and screwed it into the threaded 6NF40 hole in the brass valve seat 18. The Brass Valve seat with Needle Valve screwed in is the Adjustable In-Line Brass Valve.

Hose Connection Sleeve - Refer to FIGS. 2, 4, 5 and 6

The hose connection sleeve 12 is made from a solid piece of brass 1⅜ inch long an ½ inch OD. I drilled a hole through the center from one end to the other, the complete 1⅜ inch, 14/64 ID. I next put this into the chuck of a ¼ inch electric drill and left one inch sticking out. With the drill running I then draw filed the whole one inch piece down to 25/64 OD. I then measured 12/64 inch back from the tip and made a rounding taper to the tip so a hose would slip on easily. Within the 12/64 length the taper went from 25/64 OD down to 16/64 OD at the tip. I then took the Hose Sleeve out of the chuck, turned it around and rechucked the opposite butt end with 42/64 sticking out. With drill running, starting at the end, for 8/64 of an inch I draw filed it down to 28/64 OD. The remaining area to the chuck was taken down to 25/64. Then from the butt end I measured 3/64 inch back toward the chuck on the 28/64 OD and tapered towards the butt end on about a 45° angle.

Compression Nut - Refer to FIGS. 2 and 3

The nut 16 used had a hole through it for the 5/16 inch copper tubing. I took a 25/64 inch drill and enlarged the hole in the compression nut to 25/64 inch. A 9/16 inch boxed or open end wrench is used to tighten or loosen the compression nut.

Assembly of the Pump Injector

To assemble the pump injector 10, position the compression connector 14 with the threads 46 down. Thread the needle valve member 24 into the valve seat member 18 as shown in FIG. 2 with the enlarged head of member 24 up, to provide an assembled adjustable in-line needle valve. Place this in-line needle valve subassembly in the top opening of the connector 14. Next put the hose sleeve 12 with the butt end 32 down, down over the assembled valve members 18 and 24. Next slip the compression nut 16 down over the hose sleeve 12 until it meets the compression connector 14 and tighten over threads 21 to prevent air leaks.

I claim:

1. A pump injector valve apparatus comprising:
   an externally threaded needle valve member having an adjusting head on one end thereof and a tapered shank at the other end thereof;
   a valve seat member with a longitudinal passage therethrough having a side port opening through the side wall of the passage intermediate its opposite ends, said passage being threaded at one end for receipt of said needle valve member so that the tapered end thereof is positioned adjacent said side port;
   connection means including a sleeve surrounding said needle valve member and said valve seat member, for connecting said valve apparatus to an auxiliary liquid supply and for transmitting said auxiliary liquid through said side port into said passage, said adjusting head of said needle valve member being contained within the sleeve;
   means provided on said adjusting head for rotating said needle valve member to adjust the flow of said auxiliary liquid through said side port;
   pump connector means including an externally threaded tubular connector member, for connecting the outlet end of said passage in said valve seat member to a liquid pump for injecting said auxiliary liquid into the main pumped liquid; and
   compression means including a compression nut, for clamping said valve seat member between said sleeve and said pump connector member, said sleeve having an external flange at one end thereof which is engaged by said compression nut and said nut being threaded onto said connector member to clamp said sleeve between said nut and said connector member.

2. A valve in accordance with claim 1 in which said needle valve member has an enlarged adjusting head.

3. A valve in accordance with claim 1 in which the sleeve has a tapered outer surface at the other end which is adapted to be engaged by the hose.

4. A valve in accordance with claim 3 in which the pump connector means is provided with a threaded end for attaching it to the pump to enable the needle valve to inject an auxiliary fluid into the pumped fluid.

5. A valve in accordance with claim 1 which is of the in-line type having a fluid inlet at the end of the sleeve and a fluid outlet at the end of the valve seat member, said inlet and outlet being aligned with the axis of movement of the needle valve member.

* * * * *